April 8, 1969

C. O. HILL 3,436,795

ANCHOR RELEASE DEVICE

Filed April 17, 1968

INVENTOR
Charles O. Hill

BY  J. G. Cooke
    J. O. Tresansky

ATTORNEYS the other

United States Patent Office 3,436,795
Patented Apr. 8, 1969

3,436,795
ANCHOR RELEASE DEVICE
Charles O. Hill, Seattle, Wash., assignor, by mesne assignments, to the United States of America as represented by the Secretary of the Navy
Filed Apr. 17, 1968, Ser. No. 721,975
Int. Cl. F16b 45/02; B66c 1/34
U.S. Cl. 24—241       10 Claims

ABSTRACT OF THE DISCLOSURE

A quick release apparatus having a rotatable jaw normally held in a closed position by a spring-biased latch. A pivotal cam engages both the latch and a striker shaft, the latter of which, when actuated, causes the cam to urge the latch out of engagement with the rotatable jaw.

Background of the invention

The present invention generally relates to quick release devices and more particularly to a release device capable of positive disengagement while under heavy load.

Various quick release devices have been devised for disengaging a load from a cable to which the load is attached or suspended. When these devices were used in a deep water environment for releasing various objects, such as buoy anchors from their anchor cables, it was discovered that the release device was incapable of actuation because of the severe stress exerted on the device.

Further investigation revealed that in the construction of present devices many of the components thereof extend outwardly beyond the confines of the frame and become entangled with adjacent equipment and lines. Also, it was observed that the prior devices included jaw members and actuators therefore which tended to cause a reengagement and relocking of the object being released subsequent to the unlatching thereof. This, of course, substantially reduced the effectiveness of the release device. In addition to the above structural and operational deficiencies, the prior art devices included complicated and involved structures and structural arrangements and hence were found to be prone to jamming and at the same time expensive to manufacture.

Summary of the invention

Accordingly, it is an object of the present invention to provide an improved, inexpensive, quick release device which is rugged, compact and has a minimum of working parts.

Another object of this invention is the provision of a reliable quick release device which will positively release under heavy applied loads.

Still another object of the present invention is to provide a quick release device which locks in the open position after release of the load thereby precluding the possibility of thereafter relocking such load.

A still further object of the present invention is to provide a compact quick release device having an overall configuration which minimizes the likelihood of entanglement with any adjacent equipment and lines or cables.

According to the present invention, the foregoing and other objects are attained by a quick release device having a slideable latch member maintained in an initial or latching position by a pivotal cam member to lock a pivotal jaw member in a load retaining position and which upon movement of the cam member assumes an unlatching position enabling rotation of the jaw member to a load release position. A keeper member retains the latch member in the unlatching position.

Description of the drawing

A more complete appreciation of the invention and many of the attendant advantages thereof will be readily appreciated as the same becomes better understood by reference to the following detailed description when considered in connection with the accompanying drawings wherein.

Brief description of the preferred embodiment

Figure 1:
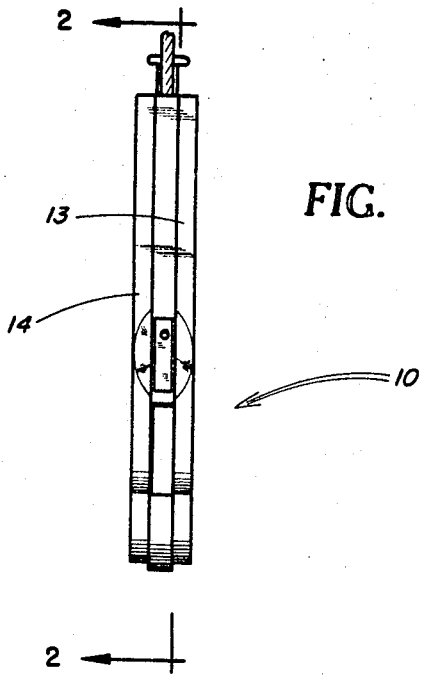
FIG. 1 is an edge view of a preferred embodiment of the invention.
Figure 2:
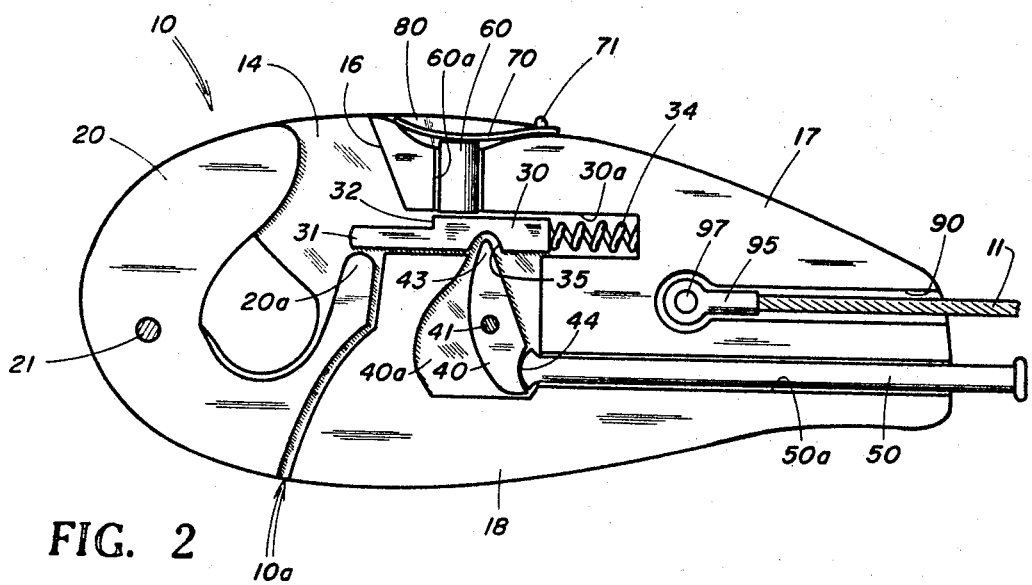
FIG. 2 is a section of the device taken along the line 2—2 of FIG. 1 showing the quick release apparatus in the fully loaded and locked position; and, FIG. 3 is a view of the release assembly similar to FIG. 2 with the assembly in the release or unlocked position and bearing no load.

Referring now to the drawings wherein like reference characters designate identical or corresponding parts throughout the several views, and more particularly to FIGS. 1 and 2 thereof, the quick release device shown generally at 10 is illustrated in the locked or loaded position and functions to support a load such, for example, as an anchor, from a cable 11 which may be attached to a supporting surface such as a buoy or ship, not shown. Device 10 includes a housing 10a comprising a pair of side plates 13 and 14 which are of similar shape and are spaced apart from each to allow other parts of the device 10 to be mounted on and between them. A plurality of filler plates 16, 17 and 18 are disposed between and secured to the side plates 13 and 14 and are spaced from each other in such a manner as to permit movement of various elements of the device 10, discussed hereinafter, within the spaces so formed.

Figure 3:
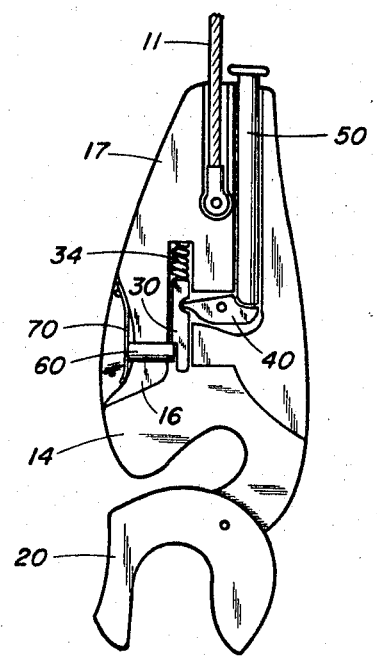

A generally U-shaped load receiving jaw member 20, including a lip 20a, is trunnioned or otherwise connected to the side plates 13 and 14 by a pin 21, the position of pin 21 and the shape of jaw 20 being such that there is a turning moment tending to rotate the jaw 20 to the open position of FIG. 3 when the device 10 is under load. In other words, the loading point of jaw 20 is offset from the center of pin 21. Jaw 20 is maintained in the locked or loaded position of FIG. 2 by reason of the engagement of lip 20a with a latch member shown generally at 30 which is slideably disposed in a space 30a formed in filler plate 17 and between filler plates 16, 17, and 18.

As viewed in FIGS. 2 and 3, the latch member 30 includes a tongue 31 which normally engages the lip 20a of jaw 20 and which terminates in a shoulder 32, the function of which will be described hereinafter. A latch coil spring 34 seated in the space 30a urges the latch 30 downwardly to the aforesaid locked position of FIG. 2 and maintains the latch 30 in this position until compressed by the upward movement of the latch 30 toward the unlatched position of FIG. 3. In order to attain this position, the latch 30 is provided in the sidewall thereof with a notch 35 the function of which will now be described.

A cam element generally indicated at 40 is positioned within a space 40a formed between filler plates 17 and 18 and is mounted for pivotal movement within such space about a pin 41 fastened to the side plates 13 and 14. Cam element 40 includes both a nib portion 43 which engages the sidewall of notch 35 and an abutment surface 44 located at a point remote from the nib 43 for receiving a releasing force. This releasing force is applied by an actuator, such as a longitudinally extending striker shaft 50 which is movably disposed within a space 50a formed between filler plates 17 and 18, and which may be actuated by hand, by explosive thruster or other appropriate means. One end of shaft 50 is positioned within housing 10a and engages surface 44 whereas the other end extends beyond the confines of the housing 10a and receives the force of the thruster.

In order to retain the latch 30 in the unlatched position of FIG. 3, a keeper 60 is slideably mounted in a space 60a formed between filler plates 16 and 17 and is urged against the tongue 31 and shoulder 32 of the latch 30, when the latter is moved toward the unlatched position, by a leaf spring 70. One end of leaf spring 70 is connected to filler plate 17 by conventional means, such as rivet 71, while the other end is free. As viewed in FIG. 1, the side plates 13 and 14 are chamfered at 80 to permit manual access to keeper 60 for the purpose of sufficiently retracting the same from the engagement thereof with shoulder 32 to enable the latch 30 to move under force of spring 34 to the latching positon of FIG. 2.

A slot 90 is provided in filler plate 17 to receive the cable 11 which is formed with a swaged eye 95 and is connected, as by a pin 97, to the side plates 13 and 14.

In operation, the quick release device 10 is suspended from a supporting surface by cable 11 and carried a load, not shown, by the jaw 20 which is in the locked position with tongue 31 of latch 30 engaging lip 20a of the jaw 20 as shown in FIG. 2. When it is desired to release the load, the striker shaft 50 is urged downwardly against the abutment surface 44 causing cam 40 to rotate about the pivot pin 41 thereof. Nib 43, which is positioned within notch 35 of latch 30, engages the sidewall thereof and slides the latch 30 upwardly against the action of the spring 34. Continued movement of latch 30 disengages the tongue 31 from contact with the lip 20a. The force of the load taken together with the position of the pin 21 and the loading point of the jaw 20 causes the jaw 20 to quickly rotate and to positively release the load. It is readily seen that the size of the load does not in any way affect the aforementioned operation of this device. When the shoulder 32 of latch 30, during the upward movement thereof, clears the position of keeper 60, the keeper 60 is urged by leaf spring 70 into engagement with tongue 31 and shoulder 32. See FIG. 3. In this position the jaw 20 is free and cannot relock upon the load. The latch 30 is maintained in this position until the keeper 60 is manually or otherwise retracted from engagement with the latch 30 at which time the spring 34 urges the latch 30 and tongue 31 to the latching position of FIG. 2.

It should be observed that after the keeper 60 is retracted and the latch 30 moves downwardly to the position of FIG. 2, the jaw 20 may be rotated from the open postion of FIG. 3 to the closed position of FIG. 2 during which time the lip 20a engages tongue 31 and urges the same rearwardly against the action of spring 34. When lip 20a passes tongue 31, the tongue 31 moves downwardly under urging of spring 34 to lock the jaw 20. It should be further noted that the extent of movement of latch 30 is insufficient to permit keeper 60 to engage the shoulder 32. It should further be observed that each of the working parts are maintained in a compact and rugged environment and do not extend beyond the confines of side plates 13 and 14. This, of course, precludes the device 10 from becoming entangled with any adjacent equipment and lines or cables.

What is claimed as new and desired to be secured by Letters Patent of the United States is:

1. A quick release device comprising:
    a housing;
    a load receiving member secured to said housing and rotatable between an open and closed position;
    latch means movable between a latching and unlatching position;
    said latch means locking said load receiving member in said closed position when said latch means is in said latching position;
    cam means engaging said latch means for moving said latch means to said unlatching position;
    actuator means for urging said cam means in a direction to move said latch means to said unlatching position; and
    keeper means retractably engaging said latch means when said latch means is in said unlatching position for maintaining said latch means in said unlatching position.

2. The device as defined in claim 1 further including:
    spring means between said housing and said latch means for urging said latch means toward the latching position; whereby when the keeper is retracted, the latch means will move toward the latching position.

3. The device as defined in claim 2 further including:
    means for connecting a supporting cable to said housing.

4. The device as defined in claim 2 wherein said load receiving member is connected by a pivot pin to said housing and wherein the loading point of said load receiving member is offset from said pivot pin.

5. The device as defined in claim 4 wherein said latch means further includes:
    tongue means for engaging a portion of said load receiving member;
    shoulder means engageable by said keeper means when said latch means is in said unlatching position; and
    a notch formed in said latch means engageable by said cam means.

6. The device as defined in claim 5 wherein said cam means is pivotally connected to said housing and further includes:
    nib means positioned within said notch formed in said latch means; and
    an abutment surface remote from said nib means for receiving the force of said actuator means.

7. The device as defined in claim 6 wherein said actuator means is a longitudinally extending shaft with one end positioned within said housing and engaging said abutment surface of said cam means and the other end extending beyond the confines of said housing for receiving a force applied thereto.

8. The device as defined in claim 7 further including:
    spring means secured to said housing for urging said keeper means into engagement with said latch means; whereby when said cam means moves said latch means to the unlatching position said keeper means engages said shoulder of said latch means and retains said latch means in the unlatching position.

9. The device as defined in claim 8 further including:
    a plurality of filler means secured within said housing, each of said filler means positioned to form spaces therebetween, said spaces accommodating said latch means, said keeper means and said actuator means for operative movement therein.

10. The device as defined in claim 6 further including:
    spring means secured to said housing for urging said keeper means into engagement with said latch means; whereby when said cam means moves said latch means to the unlatching position said keeper means engages said shoulder of said latch means and retains said latch means in the unlatching position.

References Cited

UNITED STATES PATENTS

| | | | |
|---|---|---|---|
| 845,693 | 2/1907 | Coats et al. | 294—83 |
| 1,368,647 | 2/1921 | Myers | 294—83 |
| 2,116,880 | 5/1938 | Dee | 114—230 XR |
| 3,349,745 | 10/1967 | Berg | 114—230 |

DONALD A. GRIFFIN, *Primary Examiner.*

U.S. Cl. X.R.

114—230